United States Patent [19]

Yamamuro et al.

[11] Patent Number: 4,819,514

[45] Date of Patent: Apr. 11, 1989

[54] PULLEY ACTUATING HYDRAULIC PRESSURE CONTROL FOR CONTINUOUSLY VARIABLE TRANSMISSION

[75] Inventors: Sigeaki Yamamuro, Zushi; Haruyoshi Kumura, Kamakura, both of Japan

[73] Assignee: Nissan Motor Co., Ltd., Yokohama, Japan

[21] Appl. No.: 74,984

[22] Filed: Jul. 17, 1987

[30] Foreign Application Priority Data

Jul. 25, 1986 [JP] Japan ................................ 61-173727

[51] Int. Cl.⁴ ............................................ B60K 41/12
[52] U.S. Cl. ........................................ 74/868; 474/18
[58] Field of Search .................... 74/867, 868; 474/11, 474/18, 28

[56] References Cited

U.S. PATENT DOCUMENTS

| | | | |
|---|---|---|---|
| 3,893,344 | 7/1985 | Dantlgraber et al. | 474/28 X |
| 4,522,086 | 6/1985 | Haley | 74/867 |
| 4,547,178 | 10/1985 | Hayakawa et al. | 74/867 X |
| 4,557,706 | 12/1985 | Tanaka et al. | 474/28 |
| 4,579,021 | 5/1986 | Yamamuro et al. | 74/869 |
| 4,597,308 | 7/1986 | Tanaka et al. | 74/866 |
| 4,649,486 | 3/1987 | Oshiage | 74/866 X |
| 4,651,595 | 3/1987 | Miyawaki | 74/866 |
| 4,680,990 | 7/1987 | Ohgami | 74/868 |
| 4,682,519 | 7/1987 | Okada et al. | 74/867 X |
| 4,708,031 | 11/1987 | Morimoto et al. | 74/867 |
| 4,734,082 | 3/1988 | Tezuka | 474/18 |
| 4,735,113 | 4/1988 | Yamamuro et al. | 74/867 |
| 4,736,301 | 4/1988 | Osanai | 474/18 |

FOREIGN PATENT DOCUMENTS

| | | | |
|---|---|---|---|
| 58-134260 | 10/1983 | Japan | 474/11 |
| 60-30854 | 2/1985 | Japan | . |
| 61-105351 | 5/1986 | Japan | . |

Primary Examiner—Dwight G. Diehl
Assistant Examiner—Harold F. Macris
Attorney, Agent, or Firm—Foley & Lardner, Schwartz, Jeffery, Schwaab, Mack, Blumenthal & Evans

[57] ABSTRACT

According to a hydraulic pressure control system for a continuously variable transmission embodying the present invention, a hydraulic fluid pressure supplied to pulleys is increased temporarily during a transient period where the transmission upshifts from a reduction ratio to a smaller reduction ratio as a result of a predetermined movement of a manual selector valve. The level of the hydraulic fluid pressure is allowed to return to the previous low level after the transient period.

5 Claims, 7 Drawing Sheets

PULLEY ACTUATING HYDRAULIC PRESSURE CONTROL FOR CONTINUOUSLY VARIABLE TRANSMISSION

BACKGROUND OF THE INVENTION

The present invention relates to a pulley actuating hydraulic pressure control system for a continuously variable transmission, and more particularly to a line pressure control system for a continuously variable transmission.

Laying-open Japanese Patent Application No. 60-30854 discloses a line pressure control system for a stepped automatic transmission. According to this known line presure control system, a line pressure is increased temporarily when a manual valve is placed from a D (drive) range position to a L (low) range position. With this increased line pressure, a hydraulic force large enough for effecting rapid shifting toward a large reduction ratio is generated.

EP No. 0180209 or copending U.S. patent application Ser. No. 922,400, filed Oct. 23, 1986, now U.S. Pat. No. 4,735,113, discloses a continuously variable transmission. In this known continuously variable transmission, a V-belt between a driver pulley and a follower pulley tend to slip during a transient period upshifting from a reduction ratio state to a smaller reduction ratio state. Such a slip is noticeable when a manual valve is selected from a L range position to a D range position during acceleration of the vehicle because with the same vehicle speed and throttle opening degree, a smaller target reduction ratio is given for the D range than a target reduction ratio given for the L range, and the driver pulley expands quickly to increase the width of its V-belt receiving groove. During this quick upshifting operation, the inertia of the pulleys cannot keep a tension on the V-belt to cause a slack to occur. This results in a shortage in torque transmission capacity of the V-belt, and causes the V-belt to slip immediately after the manual valve has been moved from the L range position to the D range position. Even though the slip of the V-belt occuring during the above-mentioned transient period may be reduced if the line pressure is increased to a sufficiently high level, the V-belt will wear at an increased rate if the line pressure increased to the sufficiently high level is always supplied to the pulleys, This shortens the operating life of the V-belt. Besides, this causes an increased operating loss of the associated oil pump.

The present invention aims at providing a hydraulic pressure control system for a continuously variable transmission which can prevent a V-belt from slipping during the above-mentioned transient period without shortening the operating life of the V-belt.

SUMMARY OF THE INVENTION

According to a hydraulic pressure control system for a continuously variable transmission embodying the present invention, a hydraulic fluid pressure supplied to pulleys is increased temporarily during a transient period where the transmission upshifts from a reduction ratio to a smaller reduction ratio as a result of a predetermined movement of a manual selector valve. The level of the hydraulic fluid pressure is allowed to return to the previous low level after the transient period.

More specifically, the continuously variable transmission includes means for supplying a line pressure to the follower pulley, and means for controlling fluid supply to the driver pulley and fluid discharge therefrom to adjust a reduction ratio between the driver and follower pulleys, and means for temporarily increasing the line pressure in response to the predetermined movement of the manual selector valve commanding a downshift in the reduction ratio, whereby a force with which the follower pulley grips the V-belt increases temporarily in response to the increase in the line pressure.

According to the preferred embodiment, the line pressure is generated by a line pressure regulator valve which is connected to a throttle valve such that the line pressure is increased in response to an increase in a throttle pressure generated by the throttle valve. The throttle valve is connected to an electromagnetically operated valve which is operable in response to an output signal from a control unit so that the level of the throttle pressure is adjustable by the control unit via the electromagnetically operated valve. The control unit senses the predetermined movement of the manual selector valve and instructs via the electromagnetically operated valve to the throttle valve to increase the throttle pressure for a predetermined period. Then, the line pressure regulator valve increaes the line pressure in response to the increase of the throttle pressure supplied thereto.

DESCRIPTION OF THE EMBODIMENT

Figure 1:
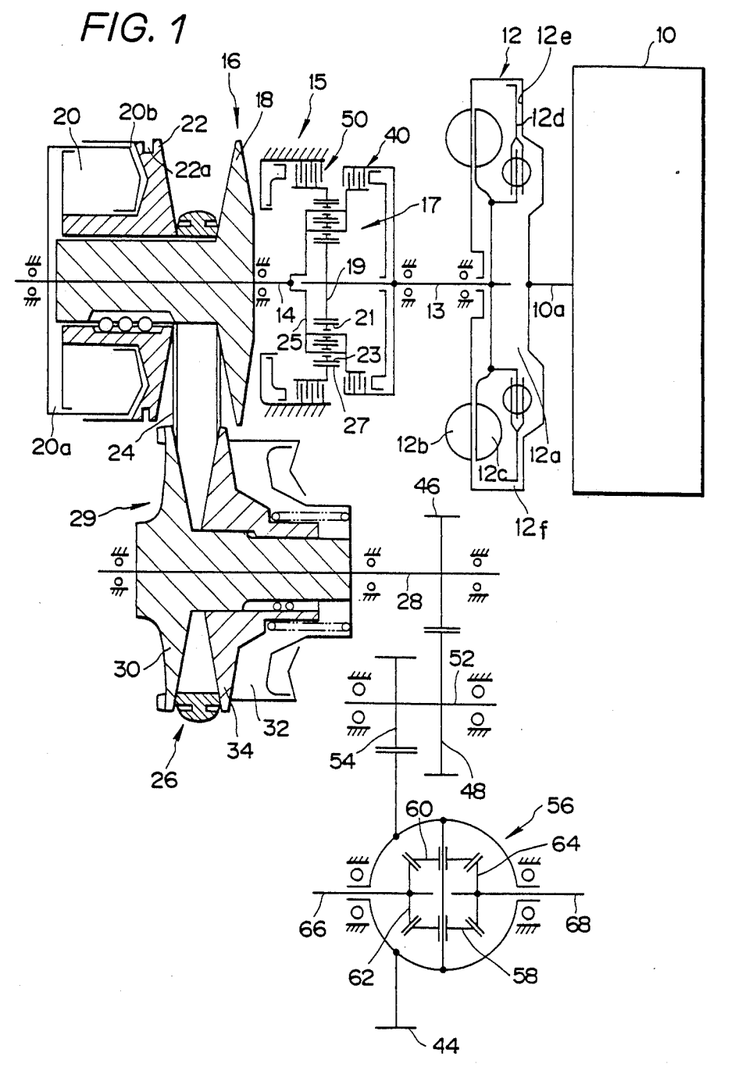
FIG. 1 is a schematic diagram showing a power transfer mechanism of the continuously variable transmission.

Referring to FIG. 1, there is shown a power transfer mechanism for a continuously variable transmission. There is shown an engine 10 having an output shaft 10a which is coupled with a hydrokinetic torque transmitting unit in the form of a fluid coupling 12. The fluid coupling 12 is equipped with a lock-up mechanism which is, hydraulically operated and has a lock-up state where a pump impeller 12b, h.e., an input element, is mechanically connected with a turbine runner 12c, i.e., an output element, and a release state where the former is fluidly connected with the latter. The lock-up mechanism includes a friction clutch element 12d rotatable with a turbine runner 12c. The clutch element 12d divides the inside of the fluid coupling 12 into two chambers, including a lock-up fluid chamber 12a, on the opposite sides thereof. When it is in the illustrated position, the clutch element 12d is disengaged from the adjacent end wall 12e rotatable with the pump impeller 12b. This illustrated position is established when hydraulic fluid is supplied to the lock-up chamber 12a. The hydraulic fluid is then allowed to pass through a clearance 12f formed around the outer periphery of the clutch element 12d to flow into the inside of the fluid coupling 12, i.e., a toroidal circuit formed by the pump impeller 12b and the turbine runner 12c. When the hydraulic fluid is discharged from the lock-up fluid chamber 12a and hydraulic fluid is supplied directly into the inside of the fluid coupling 12, there occurs a pressure difference across the clutch element 12d urging it into firm engagement with the adjacent wall 12e. The output element of the fluid coupling 12 is coupled with a rotary shaft 13. The rotary shaft 13 is coupled with a forward-/reverse drive change-over mechanism 15. The forward/reverse drive change-over mechanism 15 has a planetary gearing 17, a forward clutch 40, and a reverse brake 50. The planetary gearing 17 comprises a sun gear 19, a pinion carrier 25 having two sets of planetary pinions 21, 23, and a ring gear 27. Two pinions 21, 23 are intermeshed. Each planetary pinion 21 meshes with the sun gear 19, while each planetary pinion 23 meshes with the ring gear 27. The sun gear 19 is coupled with the rotary shaft 13 for unitary rotation therewith. The pinion carrier 25 is selectively coupled with the rotary shaft 13 by a forward clutch 40. The ring gear 27 is selectively held to a stationary portion by the reverse brake 50. The pinion carrier 25 is rotatable with a driver shaft 14. Mounted on the drive shaft 14 is a driver pulley 16. The driver pulley 16 comprises an axially stationary conical disk 18, and an axially movable conical disk 22 that is arranged in opposed relationship the axially stationary conical disk 18 so as to define a V-shaped pulley groove therebetween and displaceable in axial direction of driver shaft 14 under bias of hydraulic fluid pressure applied to a driver pulley cylinder chamber 20. The driver pulley cylinder chamber 20 comprises two chambers 20a and 20b, and has an effective pressure acting area twice as large as an effective pressure acting area of a later described follower pulley cylinder chamber 32. The driver pulley 16 is drivingly connected to the follower pulley 26 via a V-belt 24. The follower pulley 26 is mounted on a follower shaft 28. The follower pulley 26 comprises an axially stationary conical disk 30 rotatable with the follower shaft 28, and an axially movable conical disk 34 that is arranged in opposed relationship with the axially stationary conical disk 30 so as to define a V-shaped pulley groove and displaceable along the follower shaft 28 under the bias of hydraulic fluid pressure applied to a follower pulley cylinder chamber 32. Fixedly connected to the follower shaft 28 is a driver gear 46 which is in mesh with an idler gear 48 rotatable with an idler shaft 52. The idler shaft 52 has a pinion gear 54 rotatable therewith, the pinion gear 54 being in mesh with a final gear 44. A pair of pinion gears 58 and 60 of a differential 56 are fixedly attached to the final gear 44 for rotation therewith. The pinion gears 58, 60 are in mesh with a pair of side gears 62, 64, respectively, which are coupled with a pair of output shafts 66, 68, respectively.

Torque from the output shaft 10a of the engine 10 is transferred via the fluid coupling 12 and the rotary shaft 13 to forward/reverse drive change-over mechanism 15. Then, the torque is transferred to the driver shaft 14 depending upon the state of the forward/reverse drive change-over mechanism 15 such that when the forward clutch 40 is engaged and the reverse brake 50 is released, the torque from the rotary shaft 13 is transferred to the driver shaft 14 via the planetary gearing 17, whereas when the forward clutch 40 is released and the reverse brake 50 is engaged, the planetary gearing 17 acts to inverse the direction of torque in transferring it from the rotary shaft 13 to the driver shaft 14. The torque transferred to driver shaft 14 is transferred via the driver pulley 16, V-belt 24, follower pulley 26, follower shaft 28, driver gear 46, idler gear 48, idler shaft 52, pinion gear 54, and final gear 44 to the differential 56 where it is translated to rotate output shafts 66, 68 in a forward or reverse direction. It is to be noted that the neutral is established when both forward clutch 40 and reverse brake 50 are released. In the process of the above mentioned torque transfer, the ratio of rotation between the driver pulley 16 and the follower pulley 26 can be varied by altering the contact radius of the driver pulley 16 with the V-belt 24 and that of the follower pulley 26 with the V-belt 24. The variation of the ratio is caused by axial displacement of the axially movable conical disk 22 of the driver pulley 16 and axial displacement of the movable conical disk 34 of the follower pulley 26. For example, if the width of the V-shaped pulley groove of the driver pulley 16 is increased and the width of the V-shaped pulley groove of the follower pulley 26 is decreased, the contact radius of the driver pulley 16 becomes small whereas that of follower pulley 26 becomes large. This causes an increase in a reduction ratio. If the axially movable conical disks 22 and 34 are displaced in the directions opposite to the directions in which the counterparts displaced in the above mentioned case, a reduction ratio becomes small.

Figure 2A:
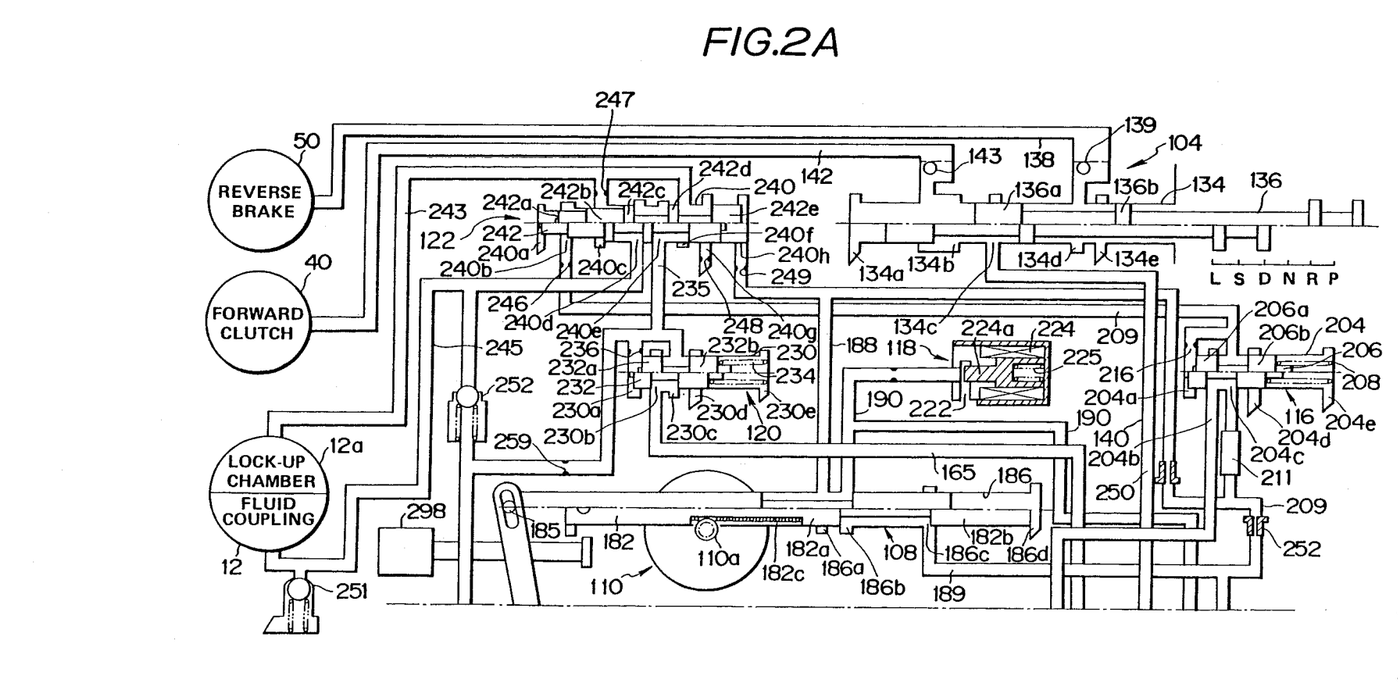
FIGS. 2A and 2B, when combined, illustrates a hydraulic circuit diagram incorporating a line pressure according to the present invention.
Figure 2B:
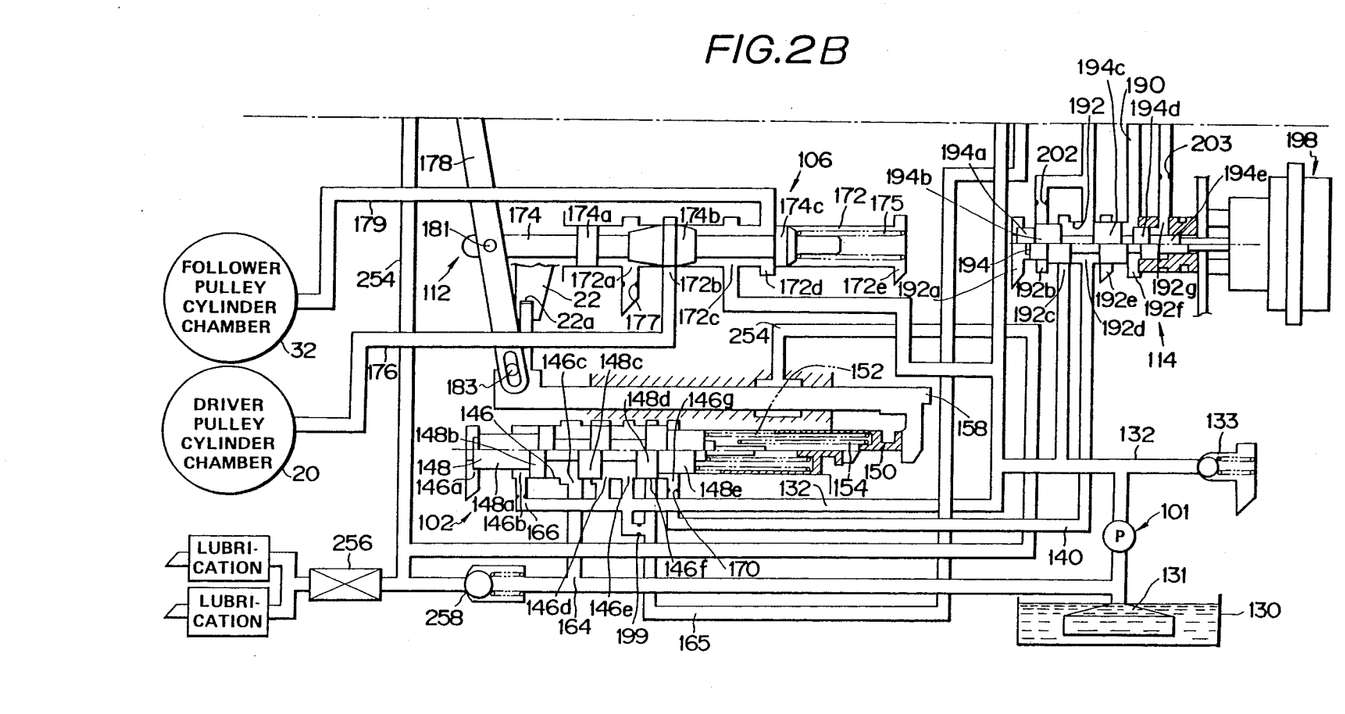

Hereinafter, a hydraulic control system for the continuously variable transmission is described. As shown in FIGS. 2A and 2B, the hydraulic control system comprises a hydraulic fluid pump 101, a line pressure regulator valve 102, a manual selector valve 104, a shift control valve 106, an adjustment pressure change over valve 108, a shift motor 110, a shift operation mechanism 112, a throttle valve 114, a constant pressure regulator valve 116, an electromagnetically operated valve 118, a coupling pressure regulator valve 120, and a lock-up control valve 122.

The hydraulic fluid pump 101 draws in hydraulic fluid (oil) from a tank 130 via a strainer 131, and discharges it into a hydraulic fluid line 132. The hydraulic fluid line 132 conducts the discharged fluid to ports 146b, 146d and 146e of the line pressure regulator valve 102 where pressure regulation is effected to generate a line pressure. The hydraulic fluid line 132 communicates with a port 192c of the throttle valve 114 and a port 172c of the shift control valve 106, too. This line 132 communicates also with a port 204b of the constant pressure regulator valve 116. Provided at the fluid line 132 is a line pressure relief valve 133 that prevents abnormal increase in the line pressure.

The manual selector valve 104 has a valve bore 134, formed within a valve body, that is provided with five ports 134a, 134b, 134c, 134d, and 134e, and a spool 136 having two lands 136a and 136b which cooperate with the valve bore. The spool 136 is operatively connected to a manaual selector (not shown) in a conventional manner such that manipulating the manual selector causes the spool 136 to assume six detent positions, namely P, R, N, D, S, and L ranges. The ports 134a and 134e are drain ports, and the pot 134b communicates with the forward clutch 40 via a hydraulic fluid line 142. The hydraulic fluid line 142 is provided with a one-way orifice 143 that provides a throttling effect only when the hydraulic fluid is supplied to the forward clutch 40. The port 134c communicates via a hydraulic fluid line 140 with ports 192b and 192d of the throttle valve 114. Lastly, the port 134d communicates via a hydraulic fluid line 138 with the reverse brake 50. The hydraulic fluid line 138 is provided with a one-way orifice 139 that provides a throttling effect only when the hydraulic fluid is supplied to the reverse brake 50. When the spool 136 assumes the P range position, the land 136a closes the port 134c that receives a throttle pressure via a hydraulic fluid line 140 from the throttle valve 114 (a clutch pressure regulator valve), so that the forward clutch 40 is drained via the drain ort 134a of valve bore 134, and the reverse brake 50 is drained via the drain port 134e. When the spool 136 assumes the R range position, the ports 134c and 134d are allowed to communicate with each other via a space within the valve bore defined between lands 136a and 136b so that the reverse brake 50 is supplied with the throttle pressure from the fluid line 140, whereas the forward clutch 40 is drained via the drain port 134a. When the spool 136 assumes the N range position, the port 134c is positioned between the lands 136a and 136b, and thus it is prevented from communicating with the other ports, whereas ports 134b and 134d are drained, so that, similarly to the situation established when in the P range position, the reverse brake 50 and the forward clutch 40 are both drained. When the spool 136 assumes the D, S, or L range position, the ports 134b and 134c are allowed to communicate with each other via a space within the valve bore defined between lands 136a and 136b, allowing supply of the throttle pressure to the forward clutch 40, whereas the reverse brake 50 is drained via the drain port 134e.

From the previous description it will be understood that the power transfer is interrupted due to the release of both the forward clutch 40 and the reverse brake 50 when the spool 136 assumes the P range position or the N range position. The output shafts 66 and 68 are driven in the reversed direction due to the engagement of the reverse brake 50 when the spool 136 assumes the R range position. The output shafts 66 and 68 are driven in the forward direction due to the engagement of the forward clutch 40 when the spool 136 assumes D, S, or L range position.

The line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with the valve bore 146, a sleeve 150 axially movable within the valve bore 146, and two coaxially arranged springs 152 and 154 that are disposed between spool 148 and sleeve 150. The sleeve 150 is in abutting engagement with a bias member 158 so that it is urged to move to the left as viewed in FIGS. 2A and 2B in response to leftward movement of the bias member 158. The bias member 158 is mounted within the valve body in parallel to the axis of the valve bore 146, and it is formed, at the opposite end portion, with an integral arm meshing with a circumferential groove 22i a with which the axially movable conical disk 22 of the driver pulley 16 is formed. Arrangement is such that an increase in reduction ratio causes the sleeve 150 to move to the left as viewed in FIGS. 2A and 2B, whereas a decrease in reduction ratio causes the sleeve 150 to move to the right as viewed in FIGS. 2A and 2B. Among the two springs 152 and 154, the outside spring 152 has the opposite ends thereof always engaged by the sleeve 150 and the spool 148 and thus it is precompressed, whereas the inside spring 154 is not compressed until the sleeve 150 is moved to the left as viewed in FIGS. 2A and 2B from a position indicated by the upper half thereof by a predetermined distance. The port 146a of the line pressure regulator valve 102 is a drain port. The port 146g is supplied with the throttle pressure from the throttle pressure valve 114 via a hydraulic fluid line 140 that serves as a throttle pressure circuit. The port 146c communicates with a hydraulic fluid line 164 that serves as a drain circuit. The ports 146b, 146d, and 146e communicate with hydraulic fluid line 132 that serves as a line pressure circuit. The port 146f communicates via a hydraulic fluid line 165 with a port 230b of the coupling pressure regulator valve 120. The hydraulic fluid line 165 communicates with the line pressure hydraulic fluid line 132 via an orifice 199. The ports 146b and 146g are provided with orifices 166 and 170, respectively. As will now be understood from the preceding description, the spool 148 of the line pressure regulator valve 102 is subject to two forces directed to the left as viewed in FIGS. 2A and 2B, one due to the spring 152 alone (or both of the springs 152 and 154) and the other resulting from the fact that the throttle pressure applied to port 146g acts on a differential area between lands 148d and 148e, and it is also subject to a force directed to the right as viewed in FIGS. 2A and 2B resulting from the fact the line pressure applied to port 146b acts on a differential area between lands 148a and 148b. Thus, the spool 148 effects pressure regulation, generating the line pressure by adjusting the amount of drainage of the hydraulic fluid from the port 146d toward the port 146c until the equilibrium state is established where the above mentioned forces directed to the left and to the right balance with each other. As a result, the line pressure generated by the line pressure regulator valve 102 increases as the reduction ratio increases, and also the throttle pressure applied to port 146g increases. The adjustment of the line pressure in the above mentioned manner meets the demand that the gripping force with which the pulleys grip a V-belt be increased as the reduction ratio increases because the engine output torque increases as the throttle pressure increases.

The shift control valve 106 has a valve bore 172, formed within the valve body, that is provided with five ports 172a, 172b, 172c, 172d and 172e, and a spool 174 having three lands 174a, 174b, and 174c which cooperate with the valve bore 172, and a spring 175 biasing the spool 174 to the left as viewed in FIGS. 2A and 2B. The port 172b communicates via a hydraulic fluid line 176 with the driver pulley cylinder chamber 20, and ports 172a and 172e are drain ports. The port 172a is provided with an orifice 177. The port 172d communicates via a hydraulic fluid line 179 with the follower pulley cylinder chamber 32. The port 172c communicates with the hydraulic fluid line 132 to receive the line pressure. Left end of spool 174 is rotatably mounted on a lever 178 of the shift operation mechanism 112 by a pin 181 at a generally middle portion thereof. The land 174b has such an axial cross sectional configuration defined by a curved boundary that the hydraulic fluid supplied to port 172c mainly flows toward the port 172b, but it is partially discharged to port 172a. As a result, the hydraulic pressure developed at the port 172b is determined by the ratio of the amount of incoming flow into the port 172b to the amount of discharging flow via the port 172a. Thus, the leftward movement of the spool 174 causes an increase in clearance disposed on the discharge side and a decrease in clearance disposed on the line pressure side, resulting in an increase in hydraulic pressure developed at the port 172b. The port 172d the is always supplied with the line pressure applied to the port 172c. The hydraulic pressure at the port 172b is supplied via the hydraulic fluid line 176 to the driver pulley cylinder chamber 20, whereas the hydraulic pressure at the port 172d is supplied via the hydraulic fluid line 179 to the follower pulley cylinder chamber 32. As a result, the leftward movement of the spool 174 causes an increase in the hydraulic pressure in the driver pulley cylinder chamber 20, resulting in a decrease in the width of the V-shaped pulley groove of the driver pulley 16, and an increase in the width of the V-shaped pulley groove of the follower pulley 26. That is, this causes an increase in the contact radius of the driver pulley 16 with the V-belt 24, and a decrease in the contact radius of the follower pulley 26 with the V-belt 24, thus causing a decrease in the reduction ratio. The rightward movement of the spool 174 causes the reverse process to take place, causing an increase in the reduction ratio.

Although, as mentioned before, the lever 178 of the shift operation mechanism 112 has the middle portion thereof connected to the spool 174 and has one end connected to the before mentioned bias member 158, the opposite end of the lever 178 is connected to a rod 182 via a pin 185. The rod 182 is formed with a rack 182c that meshes with a pinion gear 110a of a shift motor 110. With this shift operation mechanism 112, if the pinion gear 110a of the shift motor 110 is rotated in such a direction as to cause the rod 182 to move to the right as viewed in FIGS. 2A and 2B, the lever 178 swings about the pin 183 clockwise, thus causing the spool 174 of the shift control valve 106 to move to the right. As described previously, this rightward movement of the spool 174 causes the axially movable conical disc 22 of the driver pulley 16 to move to the left as viewed in FIGS. 2A and 2B, thus causing an increase in the width of the V-shaped pulley groove of driver pulley 16 and a decrease in the V shaped pulley groove of the follower pulley 26, resulting in an increase in the reduction ratio. Because one end of the lever 178 is linked to the bias member 158 via the pin 183, the above mentioned movement of the axially movable conical disk 22 causes the bias member 158 to move to the left as viewed in FIGS. 2A and 2B, and this leftward movement of the bias member 158 causes the lever 178 to swing about the pin 185 disposed on the other end thereof clockwise. Thus, the spool 174 is pulled back to the left, tending to cause a decrease in the reduction ratio. In this process, the spool 174, driver pulley 16, and follower pulley 26 are stabilized in a reduction ratio providing state corresponding to the rotary position assumed by the shift motor 110. If the shift motor 110 is rotated in the opposite direction so as to urge the rod 182 to move to the left, this leftward movement of the rod 182 causes the associated members to move in a similar manner until they assume a reduction ratio state corresponding to a new rotary position of the shift motor 110. The rod 182 is movable beyond the position corresponding to the maximum reduction ratio and further to the right, as viewed in FIGS. 2A and 2B into overstroke range. Moving the rod 182 into the overstroke range will activate a change-over detection switch 298. An output signal of this detection switch 298 is supplied to the control unit 300.

The shift motor 110 (which will be hereinafter called as a "stepper motor") is so controlled as to assume a rotary position that is determined in correspondance with a pulse number signal determined in the control unit 300. The control unit 300 generates pulse number signal in accordance with a predetermined shift schedule. The adjustment pressure change-over valve 108 has a valve element thereof formed integrally with the rod 182 of the shift operation mechanism 112. That is, the adjustment pressure change-over valve 108 has a valve bore 186, formed within the valve body, that is provided with ports 186a, 186b, 186c and 186d, and lands 182a and 182b formed on the rod 182. The port 186a communicates with a hydraulic fluid line 188. The port 186b communicates with the electromagnetically operated valve 118 via a hydraulic fluid line 190. The port 186c communicates with a hydraulic fluid line 189. The port 186d is a drain port. Normally, the port 186a and port 186b are allowed to communicate with each other via a space defined within the valve bore between the lands 182a and 182b, but when the rod 182 is displaced into the overstroke range beyond the maximum reduction ratio corresponding position, the port 186a is closed and the port 186b is allowed to communicate with the port 186c.

The throttle valve 114, which serves as a clutch pressure regulator valve, has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198. When the engine intake manifold vacuum is lower than a predetermined value, for example, 300 mmHg, (viz., when intake manifold vacuum is near the atmospheric level), the vacuum diaphragm 198 biases the spool 194 to the left as viewed in FIGS. 2A and 2B, with a force that is in inverse proportion to the magnitude of the vacuum, whereas when the intake manifold vacuum is higher than the predetermined value, it applies no force to the spool 194. The ports 192a and 192g are drain ports, respectively. The ports 192b and 192d communicate with the hydraulic fluid line 140. The port 192c communicates with the hydraulic fluid line to receive the line pressure. The port 192g communicates with the before mentioned hydraulic fluid line 189. The port 192f communicates with the hydraulic fluid line 190. As will be understood as the description proceeds, this port 192f serves as a throttle pressure boost port. That is, when the hydraulic fluid pressure is supplied to this port 192f via the hydraulic fluid line 190, the throttle pressure within the hydraulic fluid line 140 increases, thus causing the line pressure regulator valve 102 to boost the level of the line pressure. The ports 192b and 192g are provided with orifices 202 and 203, respectively. Considering the forces applied to the spool 194, there are three forces with which the spool 194 is urged to move to the left as viewed in FIGS. 2A and 2B, one resulting from the fact that the hydraulic fluid pressure applied to the port 192g acts on a differential area between the lands 194d and 194e, another resulting from the fact that the hydraulic fluid pressure applied to the port 192f, and the other by the vacuum diaphragm 198, and there is a force which which the spool 194 is urged to move to the right as viewed in FIGS. 2A and 2B, which force results from the fact the hydraulic fluid pressure applied to the port 192b acts on a differential area between the lands 194a and 194b. The throttle valve 114 effects a pressure regulation until the above mentioned forces balance with each other. It will be noted that the throttle pressure generated by the throttle valve 114 is proportional to the engine intake manifold and the level of the throttle pressure is increased when the hydraulic fluid pressure applied to the port 192f increases even if the engine manifold vacuum is the same.

The constant pressure regulator valve 116 has a valve bore 204, formed in the valve body, that is provided with ports 204a, 204b, 204c, 204d, and 204e, a spool 206 having lands 206a and 206b, and a spring 208 biasing the spool 206 to the left as viewed in FIGS. 2A and 2B. The ports 204a and 204c communicate with a hydraulic fluid line 209. The port 204b communicates with the hydraulic fluid line 132 which serves as the line pressure circuit. The ports 204d and 204e are drain ports, respectively. The port 204a is provided with an orifice 216. This constant pressure regulator valve 116 effects a pressure regulation to generate a constant hydraulic fluid pressure which corresponds to the force of a spring 208 and supplies same to a hydraulic fluid line 209. The hydraulic fluid line 209 is connected via a choke type throttle valve 250 to a hydraulic fluid line 188 and it is connected via a choke type throttle valve 252 to the hydraulic fluid line 189. The hydraulic fluid line 209 is provided with a filter 211.

The electromagnetically operated valve 118 is so constructed as to adjust the dicharge, in amount, of the hydraulic fluid from the hydraulic fluid line 190 to a drain port 222 by a plunger 224a which is biased by a spring 225 under the control of a solenoid 224. The solenoid 224 is subject to pulse duty factor control by the control unit 300. When the hydraulic fluid line 188 is connected to the hydraulic fluid line 190, the hydraulic fluid pressure within the hydraulic fluid line 188 is controlled by the electromagnetically operated valve 118. Since the amount of hydraulic fluid discharged is inversely proportional to the amount of current passing through the solenoid 224, the hydraulic fluid pressure within the hydraulic fluid lines 188 and 190 is variable in inverse proportion to the amount of current passing through the solenoid 224. When the vehicle comes to a halt and the engine begins to idle, the rod 182 moves into the overstroke range, causing the adjustment pressure change-over valve 108 to assume a position indicated by a lower half thereof as illustrated in FIGS. 2A and 2B where the hydraulic fluid line 188 is disconnected from the hydraulic fluid line 190 and it is connected to the hydraulic fluid line 189, allowing the electromagnetically operated valve 118 to regulate the hydraulic fluid pressure applied to the port 192g of the throttle valve 114.

The coupling pressure regulator valve 120 has a valve bore 230, formed in the valve body, that is provided with ports 230a, 230b, 230c, 230d and 230e, a spool 232 having lands 232a and 232b, and a spring 234 biasing the spool 232 to the left as viewed in FIGS. 2A and 2B. The ports 230a and 230c communicate with the hydraulic fluid line 235, the port 230b is supplied with the hydraulic fluid from the hydraulic fluid line 165, and the ports 230d and 230e are drain ports, respectively. The port 230a is provided with an orifice 236. The coupling pressure regulator valve 120 effects pressure regulation using hydraulic fluid pressure applied to the port 230b as a source of hydraulic pressure and generates a constant hydraulic fluid pressure (a coupling pressure) corresponding to the force of the spring 234. This hydraulic fluid pressure is supplied to the hydraulic fluid line 235. This coupling pressure is used as a working pressure within fluid coupling 12, and it is also used to actuate the lock-up mechanism.

The lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. The ports 240a and 240g are drain ports, respectively the port 240b communicates with a hydraulic fluid line 209, the ports 240c and 240f communicate via a hydraulic fluid line 243 with the lock-up fluid chamber 12a, the port 240d is connected to hydraulic fluid line 245 that communicates with the fluid coupling 12. The port 240e is supplied with the constant coupling pressure from the hydraulic fluid line 235. The port 240h is connected with the before mentioned hydraulic fluid line 188. The ports 240b, 240c, 240g, and 240h are provided with orifices 246, 247, 248, and 249, respectively. This lock-up control valve 122 controls the supply of the hydraulic fluid pressure to the fluid coupling 12 and that to the lock-up fluid chamber 12a. The spool 242 shifts from one position to another position when the following three forces attain a predetermined relationship, one due to the hydraulic fluid pressure applied to the port 240b which acts on a differential area between the lands 242a and 242b, another due to the hydraulic fluid pressure applied to the port 240c which acts on a differential area between the lands 242b and 242c, and the other due to the hydraulic fluid pressure applied to the port 240h which acts on the axial end of the land 242e. When the spool 242 assumes a lock-up position indicated by the upper half thereof, the port 240f is allowed to communicate with the port 240g via a space defined in the valve bore between the lands 242d and 242e, thus allowing lock-up fluid chamber 12a to be drained via port 240g. In this lock-up position, the port 240d is allowed to communicate with the port 240e via a space defined in the valve bore between the lands 242c and 242d, thus allowing the supply of the coupling pressure generated by the coupling pressure regulator valve 120 to the inside of the fluid coupling 12 via the hydraulic fluid line 245. As a result, the lock-up mechanism assumes the lock-up state. The hydraulic fluid line 245 is provided with a relief valve 250 that prevents application of abnormally high pressure to the fluid coupling 12. When, on the other hand, the spool 242 assumes a release position indicated by the lower half thereof as illustrated in FIGS. 2A and 2B, the port 240e is allowed to communicate with the port 240f via a space defined within the valve bore between the lands 242d and 242e. thus allowing the supply of the coupling pressure to the lock-up fluid chamber 12a via the hydraulic fluid line 243. In this position of the spool 242, the port 240d is sealed by the lands 242c and 242d. As a result, the lock-up mechanism assumes the release state, thus providing a state where the hydraulic fluid is supplied, as working fluid pressure, to the inside of the fluid coupling 12 via the lock-up fluid chamber 12a past a clearance 12f (see FIG. 1). The hydraulic fluid pressure within the fluid coupling 12 is kept at a constant value by means of a pressure maintaining valve 252. The hydraulic fluid discharged by the pressure maintaining valve 252 is supplied via a hydraulic fluid line 254 to a cooler 256 where it is cooled before it is used for lubrication. The hydraulic fluid line 254 is provided with a cooler pressure maintaining valve 258. The hydraulic fluid discharged by the cooler pressure maintaining valve 258 returns via a hydraulic fluid line 164 to the reservoir 130. The hydraulic fluid line 254 leads also to an area where bias member 158 is slidably engaged with the valve body to lubricate there. The hydraulic fluid line 254 is connected via an orifice 259 with the hydraulic fluid line 235 to secure minimal supply of hydraulic fluid.

Hereinafter, the control unit 300 is further described which controls the stepper motor 110 and the solenoid 224.

Figure 3:
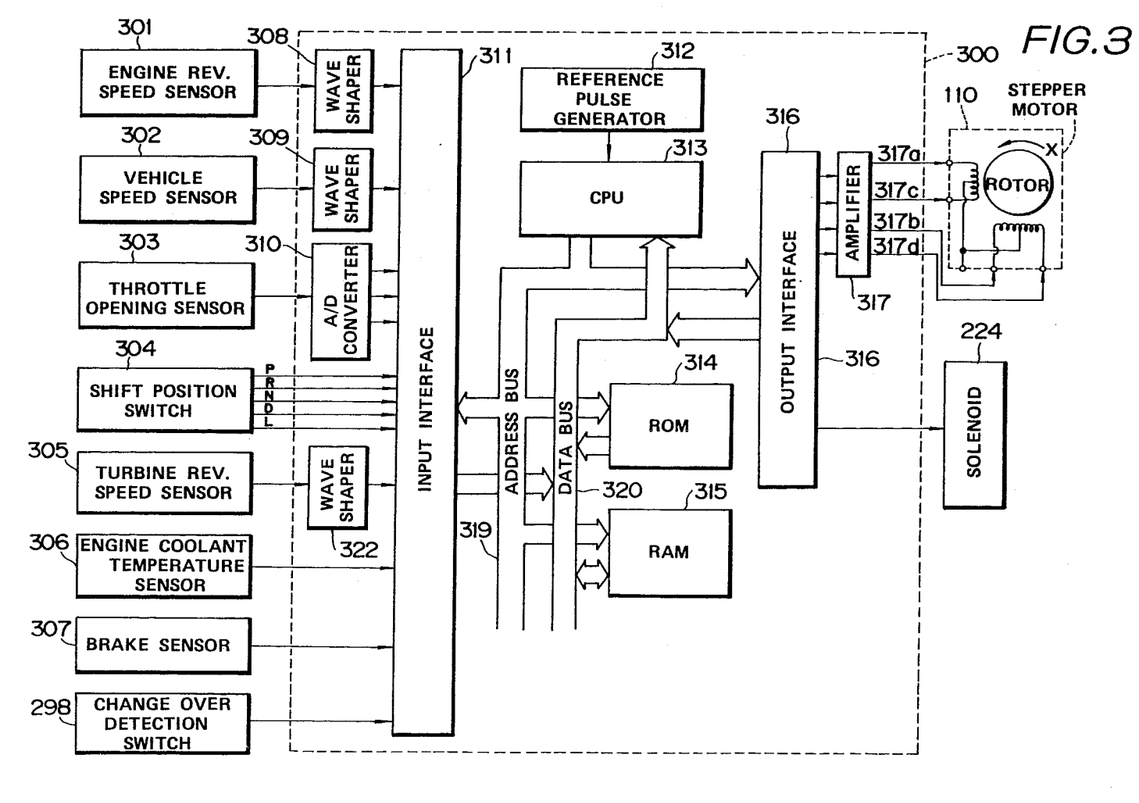
FIG. 3 is a block diagram showing a control unit.

As shown in FIG. 3, the control unit 300 is supplied with output signals of an engine revolution speed sensor 301, a vehicle speed sensor 302, a throttle opening degree sensor 303., a shift position switch 304, a turbine revolution speed sensor 305, a change-over detection switch 298, an engine coolant temperature sensor 306, and a brake sensor 307. The engine revolution speed sensor 301 detects engine revolution speed by counting the number of engine ignition spark pulses, and the vehicle speed sensor 302 detects vehicle speed of the vehicle. The throttle opening degree sensor 303 detects the engine throttle opening degree. The shift position switch 304 detects which of the range positions P, R, N, D, S, and L the manual valve 104 assumes. The turbine revolution speed sensor 305 detects the revolution speed of the turbine shaft of the fluid coupling 12. The change-over detection switch 298 is turned ON when the rod 182 of the shift operation mechanism 112 moves further beyond the maximum reduction ratio corresponding position (i.e., when the rod 182 is disposed in the overstroke range). The engine coolant temperature sensor 306 generates an output signal when the engine coolant temperature is lower than a predetermined value. The brake sensor 307 detects whether the vehicle brake is depressed. The output signals of the engine revolution speed sensor 301, vehicle speed sensor 302, and turbine revolution speed sensor 305 are supplied via associated wave shapers 308 and 309 to an input interface 311. The electric voltage signal from the throttle, opening sensor 303 is converted into a digital signal at an AD converter 310 before being supplied to the input interface 311. The control unit 300 comprises input interface 311, a CPU (central processor unit) 313, a reference pulse generator 312, a RAM (random access memoy) 315, and an output interface 316. These elements are interqonnected by an address bus 319 and a data bus 320. A reference pulse generator 312 generates reference pulses on which the CPU 313 operates. What are stored in the ROM 314 include a program for control of the stepper motor 110 and control of the solenoid 224. The RAM 315 temporarily stores information from various sensors and switches and parameters necessary for control. The output signals of the control unit 300 are supplied via the output interface 316 and an amplifier 317 to the stepper motor 110 and via the output interface 316 to the solenoid 224.

Figure 4:
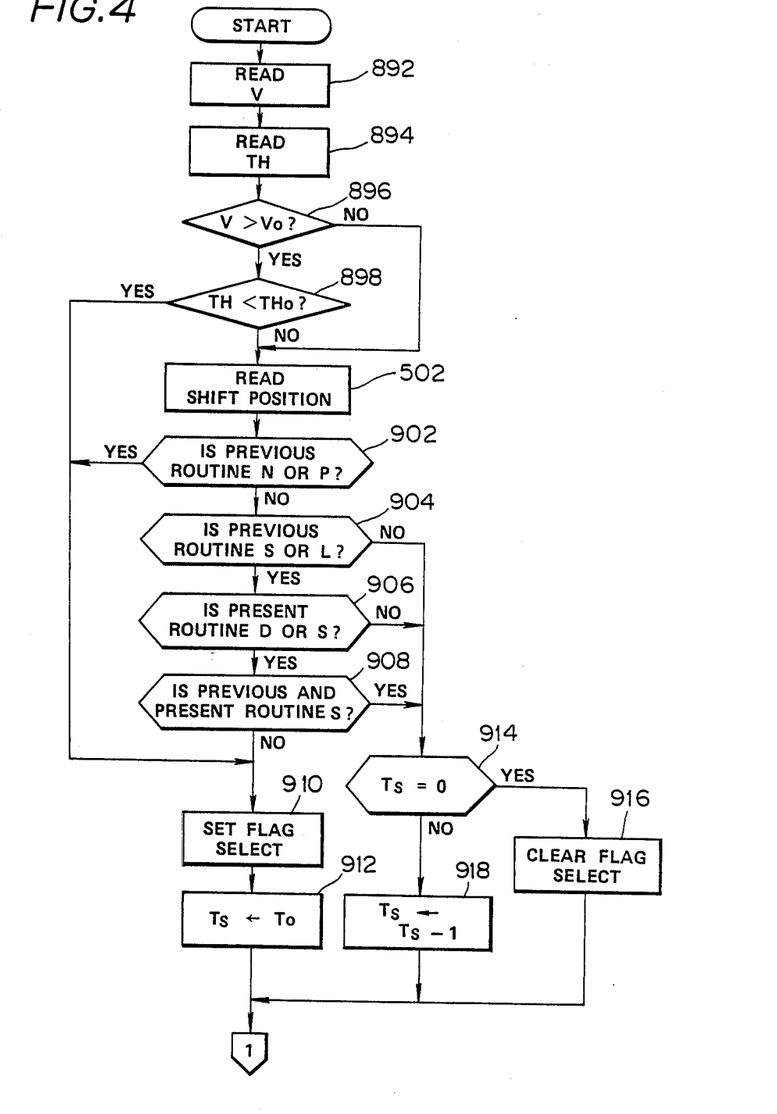
FIGS. 4, 5, and 6, when combined, show a flow chart of jobs performed by the control unit.
Figure 5:
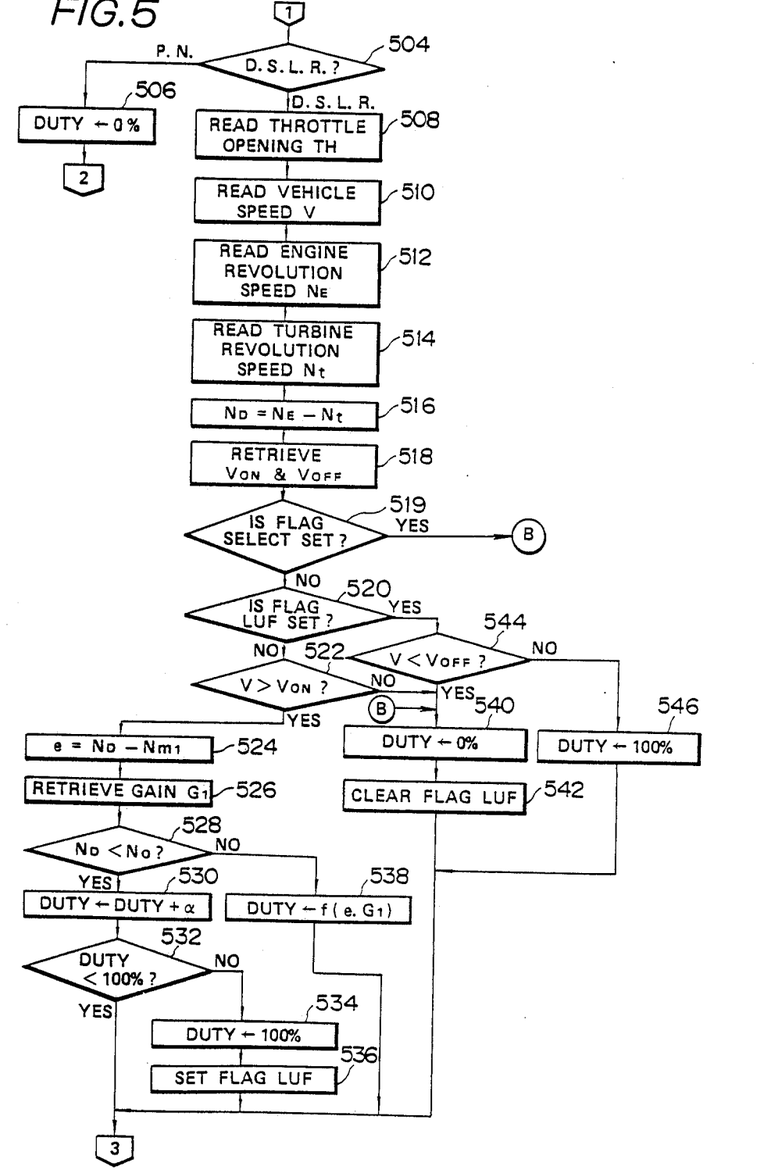
Figure 6:
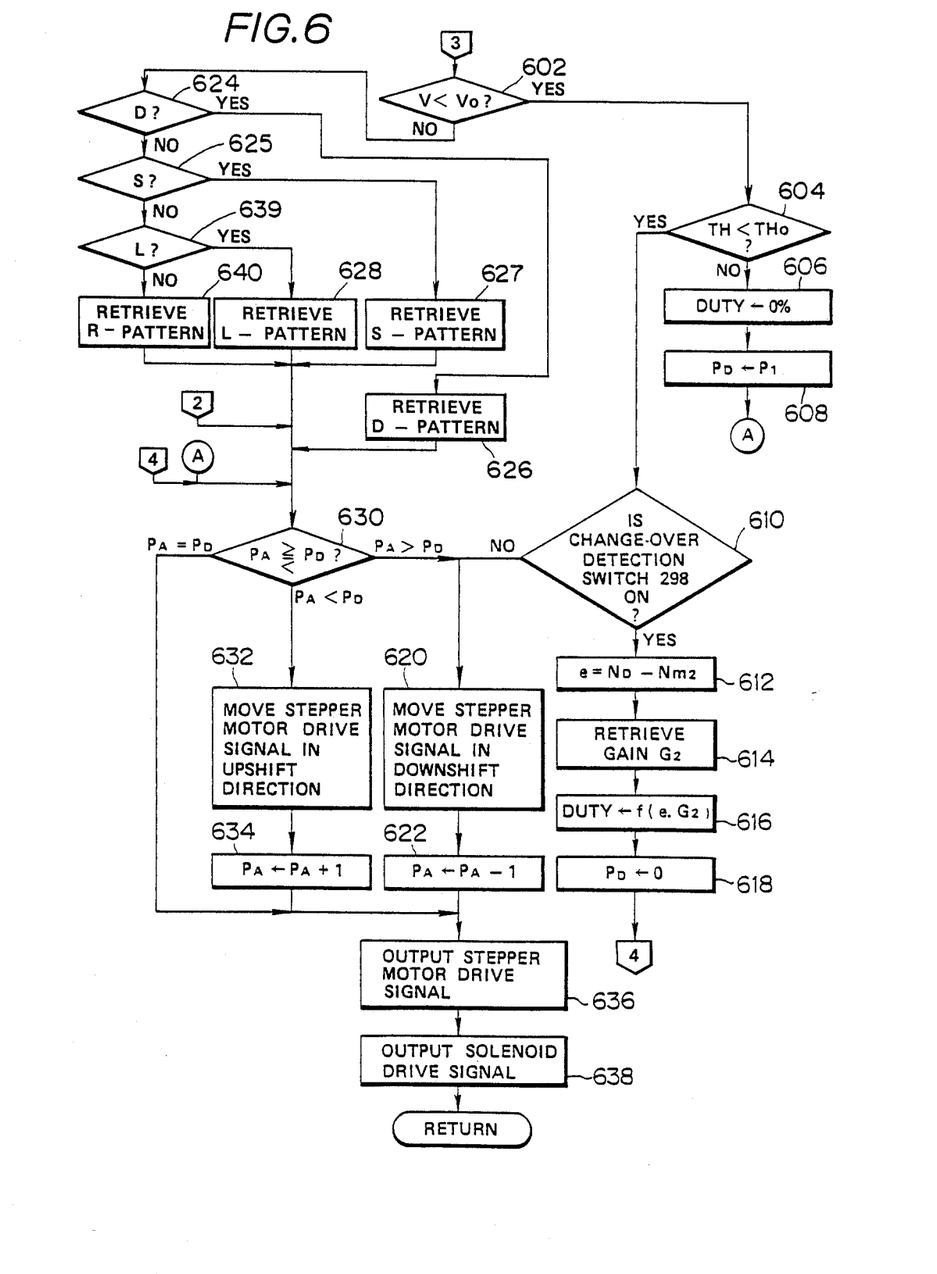

Referring to FIGS. 4 to 6, the flow chart illustrated is hereinafter described.

As shown in FIG. 4, the vehicle speed V is read at a step 892, and then the throttle opening degree TH is read at a step 894. At a step 896, a decision is made whether the vehicle speed V is greater than a predetermined value Vo. If V is not greater than Vo, the CPU 313 proceeds to a step 502. If V is greater than Vo, the CPU 313 proceeds to a step 898 where a decision is made whether the throttle opening degree TH is less than a predetermined small value THo. If TH is not less than THo, the CPU 313 proceeds to the step 502. If TH is less than THo, the CPU 313 proceeds to a step 910. That is, if the throttle opening degree is substantially closed when the vehicle speed is greater than Vo, the step 910 is executed.

At the step 502, the shift position, viz., the output signal of the shift position switch 304, is read. Then, at a step 902, a decision is made whether the shift position stored in the previous routine is one of the N range position or the P range position. If it is the N range position or the P range position, the CPU 313 proceeds to the step 910 where a flag "SELECT" is set. As will be later described, when the flag "SELECT" is set, the current supply to the solenoid 224 is cut off (see step 519). If, at the step 902, the shift position stored in the previous routine is neither the N range position nor the P range position, the CPU 313 proceeds to a step 904 where a decision is made whether the shift position stored, in the previous routine is one of the S range position or the L range position. If, at the step 904, the shift position stored in the previous routine is the S range position or the L range position, the CPU 313 proceeds to a step 906 where a decision is made whether the shift position stored in the present routine is one of the D range position or the S range position. If, at the step 906, the shift position stored in the present routine is the D range position or the S range position, the CPU proceeds to a step 908 where a decision is made whether the shift position stored in the previous routine and the shift position stored in the present routine are the S range positions, respectively. If, at the step 908, the shift positions stored in the previous routine and the present routine are not the S range positions, respectively, the CPU 313 proceeds to the step 910 where the flag "SELECT" is set. After setting the flag "SELECT" at the step 910, a select timer Ts is set equal to To at a step 912. It will be noted that the CPU 313 proceeds through the decision steps 904, 906, and 908 to the step 910 in the following three cases, i.e., one case where the previous routine S range and the present routine D range, the previous routine L range and the present routine D range, and the previous routine L range and the present routine S range. In the other cases, the CPU 313 proceeds to a step 914 from one of these decision steps 904, 906, and 908. At the step 914, a decision is made whether the select timer Ts is equal to zero. If the select timer Ts is equal to zero, the CPU 31 proceeds to a step 916 where the flag "SELECT" is cleared. If the select timer Ts is not equal to zero, the select timer Ts is decreased by 1 (one). After the step 912 or 918 or 916, the CPU 313 proceeds to a step 504 shown in FIG. 5.

Referring to FIG. 5, at the step 504, a decision is made which one of drive or running positions (i.e., D or S or L or R range) is selected based on the shift position stored in the present routine. When the P range position or the N range position is selected, the CPU 313 proceeds from the step 504 to a step 506 where 0 % is set as a duty ratio for solenoid 224 and placed at DUTY. Then, the CPU 313 proceeds from the step 506 to a step 630 shown in FIG. 6. If, at the step 504, it is decided that the D range position or S range position or L range position or R range position is selected, the CPU 313 proceeds to a step 508 where the throttle opening degree TH is read from the throttle opening sensor 303. Then, the vehicle speed V is read from the vehicle speed sensor 302 at a step 510, and the engine revolution speed $N_E$ is read from the engine revolution speed sensor 301 at a step 512, and the turbine revolution speed $N_t$ is read from the turbine revolution speed sensor 305 at a step 514. Then, a difference $N_D$ is determined by subtracting $N_t$ from $N_E$ at a step 516, and a lock-up ON vehicle speed $V_{ON}$ and a lock-up OFF vehicle speed $V_{OFF}$ are determined by retrieval using the vehicle speed V and the throttle opening degree TH at a step 518. Data of the lock-up ON vehicle speed $V_{ON}$ and the lock-up OFF vehicle speed $V_{OFF}$ are stored versus the vehicle speed V and the throttle opening degree TH. Then, the CPU 313 proceeds to a step 519 where a decision is made whether the flag "SELECT" is set. If the flag "SELECT" is set, the CPU 313 proceeds to a step 540 where the DUTY is set equal to 0%. If at the step 519, it is determined that the flag "SELECT" is not set, the CPU 313 proceeds to a step 520 where a decision is made whether a lock-up flag "LUF" is set. If the lock-up flag LUF is not set, a decision is made whether the vehicle speed V is greater than the lock-up ON vehicle speed $V_{ON}$ at a step 522. If V is greater than $V_{ON}$, a deviation e of $N_{m1}$ from $N_D$ is calculated at a step 524, where $N_{m1}$ is a target value of the difference $N_D$. Then, the 313 proceeds to a step 526 where retrieval is executed based on e to determine a feedback control gain $G_1$. Then, a decision is made whether $NH_D$ is less than a predetermined small value $N_O$ at a step 528. If, at the step 528, it is decided that $N_D$ is less than $N_O$, the CPU 313 proceeds to a step 522 where DUTY is increased by alpha %. Then, a decision is made whether DUTY is greater than 100% at a step 532. If, at the step 532, DUTY is less than 100%, the CPU 313 proceeds to the step 602 shown in FIG. 6, while if DUTY is not less than 100%, DUTY is set equal to 100% at a step 534. The CPU 313 proceeds from this step 534 to a step 536 where the lock-up flag "LUF" is set (at step 536) and then to the step 602 shown in FIG. 6. 02. If, at the step 528, it is decided that $N_D$ is not less than $N_0$, the CPU 313 proceeds to a step 538 where the "DUTY" is determined as a function of e and $G_1$ at a step 538, and then to the step 602 shown in FIG. 6. If, at the step 522, it is decided that V is not greater than $V_{ON}$, the CPU 313 proceeds to the step 540 where the "DUTY" is set equal to 0%, and then to the step 542 where the lock-up flag "LUF" is cleared. If, at the step 520, the lock-up flag "LUF" is set, the CPU 313 proceeds to a step 544 where a decision is made whether V is less than $V_{OFF}$ If, at the step 544, it is decided that V is less than $V_{OFF}$, the CPU 313 proceeds to the step 540, while, if V is not less than $V_{OFF}$, the CPU 313 proceeds to a step 546 where "DUTY" is set equal to 100%. The CPU 313 proceeds from the step 546 to the step 602 shown in FIG. 6.

Referring also to FIG. 5, after executing the step 532 or 536 or 538 or 542 or 546, the step 602 is executed. At the step 602, a decision is made whether the vehicle speed V is less than a predetermined small value $V_0$. This predetermined value V0 is set equal to a small value, for example 2 km/hr or 3 km/hr that is less than $V_{ON}$ and $V_{OFF}$. If, at the step 602, it is decided that V is less than $V_0$, a creep control is executed, whereas if V is not less than $V_0$, a reduction ratio control is executed. If, at the step 602, it is decided that V is less than $V_0$, the CPU 313 proceeds to a step 604 where a decision is made whether the throttle opening degree TH is less than a predetermined small value $TH_0$. If, at the step 604, it is decided that throttle opening degree TH is not less than $TH_0$, "DUTY" is set equal to 0% at a step 606, and a target pulse number $P_D$ is set equal to a predetermined pulse number $P_1$ at a step 608. The predetermined pulse number $P_1$ is chosen such that the stepper motor 110 causes the maximum reduction ratio to be established if this pulse number $P_1$ is given. After the step 608, the CPU 313 proceeds to a step 630. If, at the step 604, it is decided that TH is less than $TH_0$, i.e., the throttle is at the idle position, the CPU 313 proceeds to a step 610 where a decision is made whether the change-over detection switch 298 is ON. If, at the step 610, it is decided that the change over detection switch 298 is OFF, a stepper motor drive signal is shifted in a downshift direction at a step 620, and an actual pulse number $P_A$ is decreased by a value 1 at a step 622. The CPU 313 proceeds to steps 636 and 639 where the stepper motor drive signal and solenoid drive signal, i.e., the content of "DUTY", are outputted. Since the stepper motor 112 is rotated by one step toward the downshift direction in response to a movement of the stepper motor drive signal in the downshift direction, the processing through steps 610, 620, 622, 636 and 638 is repeated and thus the stepper motor 110 keeps on rotating in the downshift direction until the rod 182 moves into the overstroke range when the change-over detection switch 298 is turned ON. After the change-over detection switch 298 has been turned ON, the CPU 313 proceeds from the step 610 to a step 612 where a deviation e is determined by subtracting $N_{m2}$ from $N_D$, $N_{m2}$ designating a predeterminmed target value. Based on the value e, a retrieval is made to give a feedback gain $G_2$ at a step 614. Then, "DUTY" is given as a function of the deviation e and the feedback gain $G_2$ at a step 616, and the targe pulse number $P_D$ is set equal to zero at a step 618. After the step 618, the CPU 313 proceeds to the step 630.

Referring back to the step 602, if, at the step 602, it is decided that V is not less than $V_0$, the CPU 313 proceeds to a step 624 where a decision is made whether the shift position obtained in the present routine indicates the D range position. If, at the step 624, it is decided that the D range position is selected, the CPU 313 proceeds to a step 626 where a D range shift pattern is retrieved to give the target pulse number $P_D$. If, at the step 624, it is decided that the D range position is not selected, the CPU 313 proceeds from this step 624 to a step 625 where a decision is made whether the shift position stored in the present routine indicates the S range position. If the S range position is selected, the CPU 313 proceeds to a step 627 where a S range shift pattern is retrieved to give the target pulse number $P_D$. If, at the step 625, it is decided that the S range position is not selected, the CPU 313 proceeds from the step 625 to a step 639 where a decision is made whether the shift position stored in the present routine indicates the L range position. If the L range position is selected, the CPU 313 proceeds to a step 628 where a L range shift pattern is retrieved to give the target pulse number $P_D$. If, at the step 639, it is decided that the L range position is not selected, the CPU 313 proceeds to a step 640 where a R range shift pattern is retrieved to give the target pulse numbe $P_D$.

As a result of the retrievel carried out in the step 626 or 627 or 628 or 640, the target pulse number $P_D$ is determined and then the CPU 313 proceeds to the step 630 where the actual pulse number $P_A$ is compared with the target pulse number $P_D$. If $P_A$ is equal to $P_D$, the CPU 313 proceeds from the step 630 to the step 636 and and then to the step 638. If $P_A$ is less than $P_D$, the CPU 313 proceeds from the step 630 to a step 632 where the stepper motor drive signal is moved in an upshift direction, and then to a step 634 where the actual pulse number $P_A$ is increased by a value 1. Then, the CPU 313 proceeds to the step 636 and then to the step 638. If $P_A$ is greater than $P_D$, the CPU 313 proceeds from the step 630 to the step 620 where the stepper motor drive signal is moved in the downshift direction, and then to the step 622 where the actual pulse number $P_A$ is decreased by a value 1. Then, the CPU 313 proceeds to the step 636 and then to the step 638.

For better understanding of the control of the stepper motor using the actual pulse number and stepper motor drive signal, reference should be made to U.S. Pat. No. 4,579,308 issued to Tanaka et al. on July 1, 1986.

Referring to the shift patterns which are to be retrieved in the step 626 or 627 or 628 or 640, the D range shift pattern table contains such reduction ratio values versus vehicle speed and throttle opening degree that if the continuously variable transmission is adjusted to one of the reduction ratio values retrieved versus a given vehicle speed and a given throttle opening degree, the engine will operate on the least fuel consumption rate. The S range shift pattern table is designed for providing a light engine brake running. Thus, with the same vehicle speed and throttle opening degree, the S range shift pattern table provides a reduction ratio slightly greater than a reduction ratio given by the D range shift pattern. The L range shift pattern table is designed for providing a relatively heavy engine brake running. Thus, with the same vehicle speed and throttle opening degree, the L range shift pattern table provides a reduction ratio greater than a reduction ratio given by the S range shift pattern. Therefore, it will now be understood that the continuously variable transmission has to shift up toward a small reduction ratio quickly when the manual selector 104 is placed from the L range position to the S range position or from the S range position to the D range position or from the L range position to the D range position.

If one of the above mentioned select operations is effected when the throttle opening degree TH is equal to or greater than the predetermined value THo, the CPU 313 proceeds through the steps 502, 902, 904, 906, and 908 to the steps 910 and 912 where the flag "SELECT" is set and the timer Ts is given the predetermined value To, and then through the steps 504, 508, 510, 512, 514, 516, 518, 519 to the step 540 where "DUTY" is set equal to 0%. At the step 638, the solenoid drive signal based on the duty 0% is supplied to the solenoid 224. This causes the electromagnetically operated valve 118 to be closed, closing the drain port 222, thus preventing drainage of hydraulic fluid from the hydraulic fluid line 190. Since the hYdraulic fluid line 190 is connected to the hydraulic fluid line 188 when the throttle opening degree TH is greater tha TH₀, the hydraulic fluid pressure within the hydraulic fluid line 190 increases and takes the max level when the electromagnetically operated va 118 is closed in response to the duty 0%. The hydraulic fluid pressure is supplied through the nydraulic fluid line 90 to the throttle pressure boost port 192f of the throttle valve 114 so that the level of the throttle pressure within the hydraulic fluid line 140 increases in response to the increase of the hydraulic fluid pressure within the hydraulic fluid line 190. Since, in, the next routine, the CPU 313 proceeds from one of the steps 904, 906, and 908 to the step 914 where the content of the select timer Ts is checked and then proceeds to the step 918 until the select timer Ts is reduced to zero. The flag "SELECT" remains set during counting down of the select timer Ts so that the "DUTY" remains set equal to 0% and thus the level of the throttle pressure is temporarily increased during the time period To immediately after the manual selector 104 has been moved from the L range position to the S range position, or from the S range position to the D range position, or from the L range position to the D range position. Since this increase in the throttle pressure is supplied via the hydraulic fluid line 140 to the line pressure boost port 146g of the line pressure regulator valve 102, the level of the line pressure within the hydraulic fluid line 132 is also increased. The line pressure is supplied from the hydraulic fluid line 132 through the hydraulic fluid line 179 to the follower pulley cylinder chamber 32 without any pressure regulation at the shift control valve 106. Using the hydraulic fluid supplied from the hydraulic fluid line 132 as a source of hydraulic fluid, the fluid supply to and fluid discharge from the driver pulley cylinder chamber 20 through the hydraulic fluid line 176 are regulated by the shift control valve 106. The shifting down operation is being carried out by discharging the hydraulic fluid from the driver pulley cylinder chamber 20. Since during this transient operation the line pressure supplied to the follower pulley cylinder chamber is temporarily increased, the follower pulley 29 can grip the V-belt at a force strong enough to prevent the V-belt 24 from slipping. Thus, a transmission torque capacity to be held by the V-belt 24 during this transient operation is assured by the increase of the line pressure.

As will be appreciated from the flow chart shown in FIG. 5, the "DUTY" is set equal to 100% when the lock-up of the fluid coupling 12 is to be effected, whereas the "DUTY" is set equal to 0% when the lock-up of the fluid coupling 12 is to be released. When the duty ratio is equal to 100%, the electromagnetically operated valve 118 is fully opened, cuasing the discharge of hydraulic fluid from the hydraulic fluid line 188 through the hydraulic fluid line 190 and the drain port 222. This causes the spool 242 of the lock-up control valve 122 to assume the lock-up position as indicated by the upper half thereff illustrated in FIG. 2A. When the duty ratio is set equal to 0%, since the level of the hydraulic fluid pressure within the hydraulic fluid line 188 increases to the maximum level, the spool 242 of the lock-up control valve 122 assumes the lock-up released position as indicated by the lower half thereof illustrated in FIG. 2A. From this description, it will be noted that the lock-up of the fluid coupling 12 is temporarily released concurrently with the above described increase of the line pressure. Thus, the fluid coupling 12 can effectively absorb a torque variation occurring during the aoove described transient shifting operation, suppressing shocks inherent with the shifting operation.

Referring to FIG. 4, it will be noted that the flag "SELECT" is set at the step 910 when the vehicle speed V is greater than the predetermined value Vo and at the same time the throttle opening degree TH is less than the predetermined value THo, so that the level of the throttle pressure and the level of the line pressure is increased as long as the flag "SELECT" is being set. The throttle pressure supplied through the hydraulic fluid line 140 and the hydraulic fluid line 142 to the forward clutch 40 and the line pressure supplied to the follower pulley cylinder chamber 32 are increased as long as the flag "SELECT" is being set. This assures a transmission torque large enough to accomplish effective engine brake running. It will be noted that the CPU 313 proceeds from the step 896 through the step 898 to the step 910 when the throttle opening degree is rendered substantially zero during running of the vehicle to demand engine brake running.

From the preceding description of the embodiment according to the present invention, it will now be appreciated that since the level of the line pressure is increased only when demanded by the circumstances, the V-belt is prevented from slipping without degrading the endurability of the V-belt. Besides, in the system according to the present invention, the pump is free from substantial operating loss during operation.

What is claimed is:

1. A hydraulic pressure control system for a continlusly variable transmissiom drivingly connected to an engine of an automotive vehicle, the continously variable transmission including a transmission belt drivingly connected between a driver pulley and a follower pulley which are hydraulically actuatable, said control system comprising:
 a manual selector valve having a plurality of forward drive positions and being shiftable in a first direction from one to the other of two forward drive positions selected from said plurality of forward drive positions and in a second direction opposite to said first direction from said other to said one of said two forward drive positions selected;
 meartsfor generating a pulley actuating hydraulic fluid pressure;
 means for hydraulically actuating the driver pulley and the follower pulley in response to said hydraulic fluid pressure in such a manner as to effect an upshifting in a reduction ratio between the driver and follower pulleys in response to said manual selector valve having been shifted in said first direction from said one to said other of said two forward drive positions selected; and
 control means for causing said hydraulic fluid pressure generating means to temporarily increase the level of said hydraulic fluid pressure whenever said manual selector valve is shifted in said first direction from said one to said other of said two forward drive positions selected.

2. A hydraulic pressure control system as claimed in claim 1, wherein said hydraulic pressure generating means includes a line pressure regulator valve formed with a line pressure boost port, a throttle valve formed with a throttle pressure boost port, and a mechanism operatively connecting the driver pulley to said line pressure regulator valve, said throttle valve generating a throttle pressure which is supplied to said line pressure boost port, said line pressure regulator valve being responsive to movement of said mechanism and said throttle pressure supplied to said line pressure boost port for generating said pulley actuating hydraulic fluid pressure.

3. A hydraulic pressure control system as claimed in claim 2, wherein said hydraulically actuating means includes a shift control valve means for supplying said pulley actuating hydraulic fluid pressure to said follower pulley and regulating the supply of hydraulic fluid from said pulley actuating hydraulic fluid pressure generating means to said driver pulley and the discharge of hydraulic fluid from said driver pulley.

4. A hydraulic pressure control system as claimed in claim 3, wherein said control means includes an electromagnetically operated valve means for causing a change in hydraulic fluid pressure supplied to said throttle pressure boost port to cause said throttle valve to increase the level of said throttle pressure supplied to the line pressure boost port, and means responsive to said manual sector valve having been shifted in said first direction from said one to said other of said two forward drive positions selected for causing, via said electromagnetically operated valve, said throttle valve to increase the level of said throttle pressure for a predetermined time period.

5. A hydraulic pressure control system for a continuously variable transmission drivingly connected to an engine of an automotive vehicle, the continuously variable transmission including a transmission belt drivingly connected between a drive rpulley and a follower pulley which are hydraulically actuatable, said control system comprising:
 a pump as a source of pressurized hydraulic fluid;
 line pressure regulator means communicating with said pump to receive said pressurized hydraulic fluid for generating a line hydraulic fluid pressure;
 throttle valve means communicating with said line pressure regulator valve to receive said line hydraulic fluid pressure for generating a throttle fluid pressure variable with an intake manifold of the engine;
 a manual selector valve having a plurality of forward drive positions and being shiftable between said plurality of forward drive positions;
 means for hydraulically actuating the driver pulley and the follower pulley in response to said line hydraulic fluid pressure in sich a manner as to effect an upshifting in a reduction ratio between the driver and follower pulleys in response to a predetermined shift to said manual selctor valve;
 constant pressure regulator valve means communicating with said line pressure regulator valve meaňs to receive said line hydraulic fluid pressure for generating a constant hydraulic fluid pressure;
 electromagnetic means for selectively supplying said constant hydraulic fluid pressure to said throttle valve means for inducting a predetermined pressure increase in said throttle fluid pressure;
 said throttle valve means supplying said throttle fluid pressure to said line fluid pressure regulator valve to induce a pressure increase in said line fluid pressure in response to said throttle fluid pressure; and
 means for detecting the occurrence of said predetermined shift of said manual selector valve and rendering said electromagnetic means to supply said constant hydraulic fluid pressure to said throttle valve temporarily, whereby said line fluid pressure is temporarily increased upon occurrence of said predetermined shift of said manual selector valve.

* * * * *